United States Patent [19]
Hammer

[11] Patent Number: 5,566,074
[45] Date of Patent: Oct. 15, 1996

[54] HORIZONTAL MISS DISTANCE FILTER SYSTEM FOR SUPPRESSING FALSE RESOLUTION ALERTS

[75] Inventor: Jonathan B. Hammer, Sterling, Va.

[73] Assignee: The Mitre Corporation, Bedford, Mass.

[21] Appl. No.: 512,011

[22] Filed: Aug. 7, 1995

[51] Int. Cl.$^6$ .................................................. G06F 165/00
[52] U.S. Cl. .......................... 364/461; 364/439; 342/29; 342/455; 340/961
[58] Field of Search ................................. 364/439, 461; 342/29, 30, 31, 32, 455, 456; 340/961

[56] References Cited

U.S. PATENT DOCUMENTS

| | | |
|---|---|---|
| 3,898,656 | 8/1975 | Jensen . |
| 4,322,730 | 3/1982 | Chrzanowski . |
| 4,486,755 | 12/1984 | Hulland et al. . |
| 4,782,450 | 11/1988 | Flax . |
| 4,910,526 | 3/1990 | Donnangelo et al. . |
| 4,978,945 | 12/1990 | Funatsu .................................. 364/461 |
| 5,029,092 | 7/1991 | Funatsu . |
| 5,058,024 | 10/1991 | Inselberg . |
| 5,074,673 | 12/1991 | Sowell et al. . |
| 5,075,694 | 12/1991 | Donnangelo et al. . |
| 5,077,673 | 12/1991 | Brodegard et al. . |
| 5,081,457 | 1/1992 | Motisher et al. . |
| 5,089,822 | 2/1992 | Abaunza et al. . |
| 5,107,268 | 4/1992 | Sturm et al. . |
| 5,138,321 | 8/1992 | Hammer . |
| 5,153,836 | 10/1992 | Fraughton et al. . |
| 5,157,615 | 10/1992 | Brodegard et al. . |
| 5,202,684 | 4/1993 | Funatsu .................................. 364/461 |

(List continued on next page.)

OTHER PUBLICATIONS

A. Zhogin, et al., "Comparative Analysis of Miss Distance Filtering and Parabolic Extrapolation of Range Track", Aug. 1991, 3rd Mtg. of US/USSR Com.Subgroup.

G. Kulish, et al., "Perspective Airborne Equipment For Collision Avoidance of Civil Aircraft", Jul. 1990, 1st Mtg. of the US/USSR Com. Subgroup.

"Consistent Values of DMOD and TAU for The Bramson Range Test", Lincoln Laboratory Report, Nov. 1987.

J. Andrews, et al., "TCAS Miss Distance Filtering Based on Range Tracking", Lincoln Laboratories Project Memorandum #42PM–TCAS–0052, 5 Jul. 1990.

Zhogin, et al., "Extrapolation Approach to the Threat Detection in ACAS" Jul. 1990, First mtg. of the US/USSR Com. Subgroup.

A. Zhogin, et al., "Reduction of Unnecessary Alert Rate by Means of Parabolic Extrapolation of Range Track", Aug. 1991, 3rd mtg. of US/USSR Com. Subgroup.

Primary Examiner—Gary Chin
Attorney, Agent, or Firm—Morton J. Rosenberg; David I. Klein

[57] ABSTRACT

A horizontal miss distance filter system (220) is provided for inhibiting resolution alert messages from an air traffic alert and collision avoidance system (210) to a pilot's display (230). The horizontal miss distance filter employs a parabolic range tracker (10) to derive a range acceleration estimate (11) utilized to discriminate intruder aircraft (110) having non-zero horizontal miss distances. The horizontal miss distance calculated from the range data provided by the parabolic range tracker is compared with a bearing based horizontal miss distance provided by a bearing based tracker (22). The smaller of the two calculated horizontal miss distances defines a projected horizontal miss distance which is compared with a threshold value. Any resolution alert for intruder aircraft whose projected horizontal miss distance is greater than the threshold will be inhibited unless it is determined that the encounter involves a maneuver of one of the aircraft. As many as five maneuver detectors (50, 52, 56, 58 and 64) may be employed to assess whether the encounter involves a maneuver. If any of the maneuver detectors establish the occurrence of a maneuver, then a resolution alert provided from the TCAS system (210) will not be inhibited.

39 Claims, 6 Drawing Sheets

U.S. PATENT DOCUMENTS

| | | |
|---|---|---|
| 5,208,591 | 5/1993 | Ybarra et al. . |
| 5,227,786 | 7/1993 | Hancock . |
| 5,235,336 | 8/1993 | Sturm et al. . |
| 5,247,311 | 9/1993 | Sobocinski . |
| 5,248,968 | 9/1993 | Kelly et al. . |
| 5,264,853 | 11/1993 | Sturm et al. . |
| 5,272,725 | 12/1993 | Jones et al. . |
| 5,280,285 | 1/1994 | Curtis et al. . |
| 5,313,201 | 5/1994 | Ryan . |
| 5,317,316 | 5/1994 | Sturm et al. . |
| 5,321,406 | 6/1994 | Bishop et al. . |

HORIZONTAL MISS DISTANCE FILTER SYSTEM FOR SUPPRESSING FALSE RESOLUTION ALERTS

BACKGROUND OF THE INVENTION

FIELD OF THE INVENTION

This invention is directed to a system for suppressing false resolution alerts to be combined with an air traffic alert collision avoidance system (TCAS). In particular, this invention is directed to a horizontal miss distance filter employing a parabolic range tracker to provide projected range, projected range rate and projected range acceleration. The projected range acceleration is utilized to distinguish non-zero horizontal miss distance encounters for which a false resolution alert may be potentially generated. Still further, this invention directs itself to a system which further evaluates encounters having non-zero miss distances to determine whether an estimated horizontal miss distance is sufficiently large to not be a collision threat, thereby warranting suppression of a resolution alert. Additionally, a bearing based tracker is utilized to formulate a horizontal miss distance based on bearing information provided by the TCAS system, with the smaller of the range based horizontal miss distance or bearing based horizontal miss distance being utilized to determine whether the intruder aircraft poses a collision threat. Further, in order to avoid mistakenly inhibiting a resolution alert, maneuver detection logic is incorporated into the horizontal miss distance filter to prevent inhibiting resolution alerts when maneuvers are detected.

PRIOR ART

The traffic alert and collision avoidance system (TCAS) currently in use in all commercial aircraft having more than a predetermined number of seats is provided to warn aircraft pilots of an impending collision with an "intruder" aircraft. The TCAS system includes an aircraft-mounted beacon which interrogates and stimulates a coded response from surrounding transponder-equipped intruder aircraft. Intruder location is determined by determination of polar timing and direction finding. In the current system the timed closest point of approach is approximated through the use of range measurements. The time to closest point of approach τ (Tau) is approximated utilizing the range divided by a calculated range-rate. When the calculated timed closest point of approach reaches a critical value, a resolution alert is issued to the pilot, instructing the pilot to maneuver in a particular way so as to avoid a potential collision.

In present day TCAS systems no predictions are computed for horizontal miss distance. Thus, the pilot can receive a resolution alert and be ordered to maneuver where an intruder aircraft would in actuality be sufficiently horizontally displaced so as to never pose a collision threat. Such false alarms provide not only an annoyance, but increase the risk of an air mishap when airline pilots are unnecessarily caused to make abrupt alterations in course during what is portrayed as an emergency condition, but what in actuality does not require any action by the pilot. This shortcoming of the TCAS system has long been known and until now has not been overcome.

A number of investigations into a possible horizontal miss distance filter have taken place since 1979, and are summarized in a report by John W. Andrews, et al. "TCAS Miss Distance Filtering Based on Range Tracking", *Lincoln Laboratories Project Memorandum No. 42PM-TCAS-0052*, 5 Jul. 1990. This report concludes that horizontal miss distance filtering utilizing range tracking data cannot be practically implemented. The report looks at a number of the failure modes of range-based miss distance filtering, and concludes that such cannot be overcome, not even with reasonable technological improvements to the equipment. However, all prior attempts at range-based miss distance filtering utilized the square of the range and its derivatives, and included no means for detecting maneuvers of aircraft.

Other prior art references known to the Applicant include U.S. Pat. Nos. 3,898,656; 5,227,786; 5,157,615; 5,107,268; 5,075,694; 4,910,526; 5,029,092; 5,081,457; 5,208,591; 5,077,673; 5,153,836; 5,321,406; 5,317,316; 4,322,730; 5,089,822; 5,264,853; 5,247,311; 5,248,968; 5,235,336; 4,486,755; 5,313,201; 5,058,024; 5,280,285; 5,272,725; 4,782,450; 5,138,321; and, 5,074,673. The Applicant is also aware of several publications related to traffic alert and collision avoidance systems using range measurements. In particular, reference is made to Zhogin, A.I., et al., "Extrapolation Approach to the Threat Detection in ACAS", July 1990, First Meeting of the US/USSR Communications Subgroup, Leningrad; Zhogin, A.I., et al., "Reduction of Unnecessary Alert Rate by Means of Parabolic Extrapolation of Range Track", August 1991, Third Meeting of the US/SSR Communications Subgroup, Leningrad; and, Zhogin, A.I., et al., "Comparative Analysis of Miss Distance Filtering and Parabolic Extrapolation of Range Track", August 1991, Third Meeting of the US/SSR Communications Subgroup, Leningrad. However, none of these prior approaches to the problem disclose or suggest the concatenation of elements which define the instant invention.

SUMMARY OF THE INVENTION

A system for suppressing a false resolution alert advisory message from an air traffic alert and collision avoidance system is provided. The system includes a subsystem for input of a surveillance range measurement of an intruder aircraft from the air traffic alert and collision avoidance system. The system also includes a range tracking subsystem coupled to the surveillance range measurement input subsystem for determining horizontal miss distances greater than a predetermined value using at least a selected one of a plurality of predicted range based parameters. The selected predicted range based parameter is compared with a predetermined first threshold value. Further, the system includes an inhibit subsystem coupled to the range tracking subsystem and the air traffic alert and collision avoidance system for inhibiting transmission of a resolution alert message responsive to the selected predicted range base parameter being greater than the first threshold value.

DESCRIPTION OF THE PREFERRED EMBODIMENT

Referring now to FIGS. 5–8, there is shown, a system 220 for suppressing a false resolution alert, or advisory, transmitted to a display 230 in an aircraft from an air traffic alert and collision avoidance system 210. System 220 provides horizontal miss distance filtering, inhibiting the transmission of a resolution alert message to the pilot's display 230 for intruder aircraft whose horizontal displacement from one's own aircraft is projected to be greater than a predetermined minimum value at its closest point of approach. In addition to suppressing false resolution alerts, system 220 provides a more accurate estimate of the estimated time to closest approach of the intruder aircraft.

Figure 1:
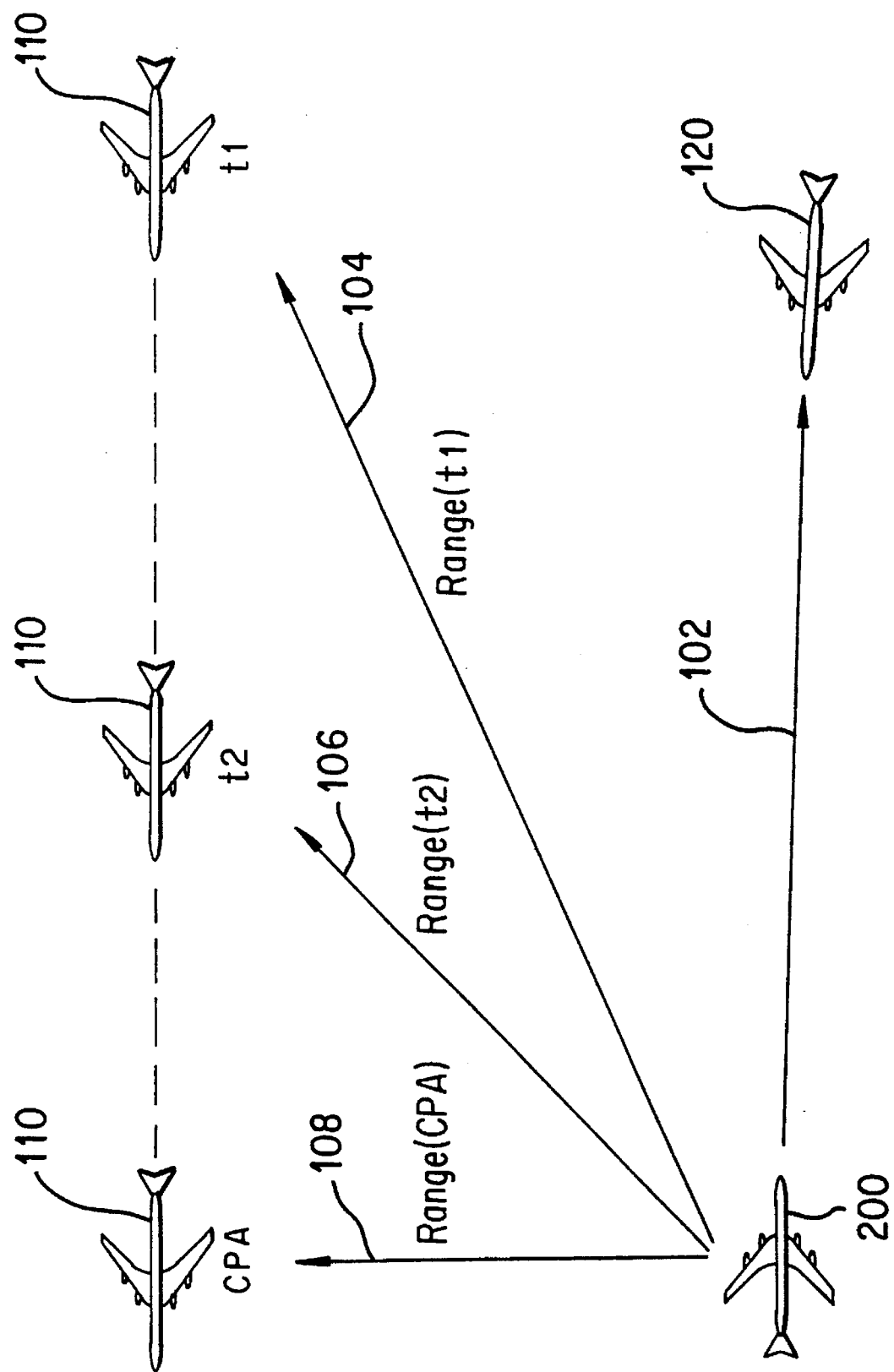
FIG. 1 is a graphic illustration of one's own aircraft and a pair of potential intruder aircraft.

To understand the problem and the solution provided by system 220, reference is made to FIGS. 1–4. As shown in FIG. 1, one's own aircraft 200 is flying on a predetermined course at a particular altitude and speed. The air traffic alert and collision avoidance system (TCAS) of one's own aircraft 200 detects two intruder aircraft 110 and 120. Intruder aircraft 120 is flying on a substantially collision course with aircraft 200 and is displaced from aircraft 200 by a range indicated by the vector 102. The TCAS system aboard aircraft 200 will properly issue a resolution alert when the estimated time of closest point of approach or collision reaches a predetermined value, instructing the pilot of aircraft 200 to maneuver to avoid the potential collision. As shown in the drawing, aircraft 200 and 120 will have a horizontal miss distance (HMD) of substantially zero at their closest point of approach. Obviously, a resolution alert message to the pilot of aircraft 200 relative to intruder aircraft 120 is proper and should not be suppressed. For other aircraft whose horizontal miss distance is greater than zero, the determination of whether a resolution alert message transmitted by the TCAS system 210 should be suppressed will be a function on the magnitude of the projected horizontal miss distance at the closest point of approach between the two aircraft and whether either aircraft is maneuvering.

Looking now at intruder aircraft 110 relative to one's own aircraft 200, at time t1 the range between aircraft 200 and aircraft 110 is indicated by the vector 104. As shown, even though the aircraft 200 and 110 are on opposite headings, there is a substantial horizontal distance between them, as indicated by vectors 104, 106 and 108. As aircraft 200 and 110 move toward each other, closing the distance therebetween, the range vector is reduced in magnitude. Thus, at time t2 the range between aircraft 200 and aircraft 110 is indicated by the vector 106, the vector 106 having a substantially reduced magnitude from that of vector 104. At the closest point of approach between the aircraft 200 and the aircraft 110 the range is at a minimum value, indicated by vector 108, and is equal to the actual horizontal miss distance. When such horizontal miss distance is projected to be greater than some minimum value, a resolution alert message should not be issued, however, the current TCAS system 210 has very limited means for filtering out such intruder aircraft having a sufficiently large projected horizontal miss distance to not be considered a threat. The horizontal miss distance filter system 220 provides an effective capability of identifying intruder aircraft which pose no collision threat to the TCAS system 210, to thereby inhibit transmission of a resolution alert message for those intruder aircraft whose projected horizontal miss distance at the point of closest approach is greater than the requisite minimum value.

The change in range between aircraft 200 and aircraft 120 linearly decreases, as the bearing (azimuth) between the two aircraft does not change as they approach one another. However, for intruder aircraft 110, by virtue of its horizontal displacement, provides a change in range between aircraft 200 and aircraft 110 which is non-linear. The azimuth and magnitude of the range between the aircraft 200 and aircraft 110 both change with time, decreasing to the closest point of approach and then increasing again as the two aircraft pass one another in opposing directions. The non-linearity in the change in range with respect to time for intruder aircraft, which are horizontally displaced from one's own aircraft, provide a means for distinguishing such conditions. However, the change in the actual range value over small time increments, a time period in which it is necessary to be able to distinguish whether an intruder aircraft is an actual threat, is too small to be able to accurately to make such a distinction. The TCAS system provides range data which has an accuracy approximately 30 ft RMS (Root Mean Square) for any single measurement, wherein the non-linearity of the range versus time curve for an aircraft 110 might only vary by a distance of less than two feet. However, greater changes can be seen in the other state variables, such as the first derivative (velocity) and the second derivative (acceleration).

Figure 2:
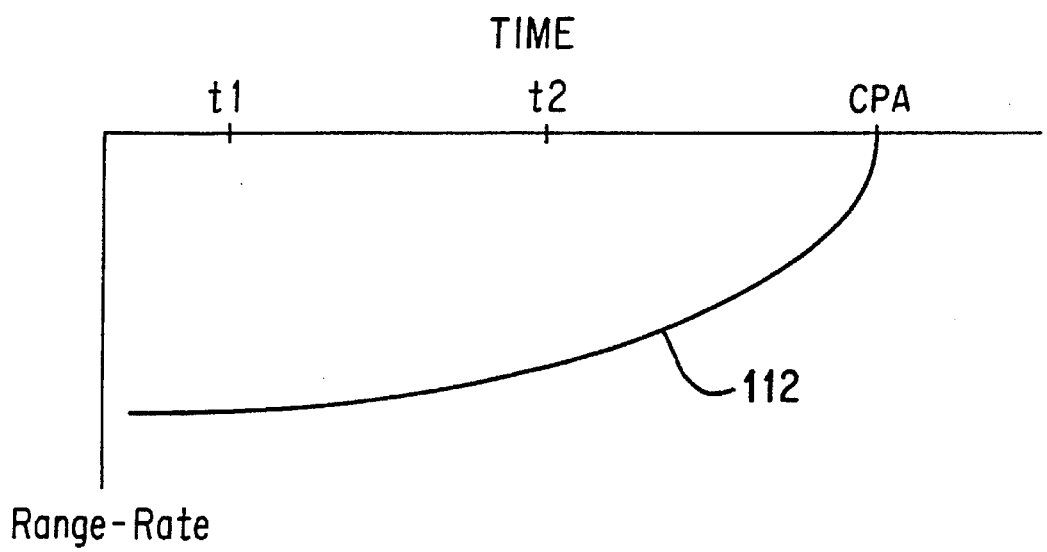
FIG. 2 is a graph of range rate versus time for an intruder aircraft.
Figure 3:
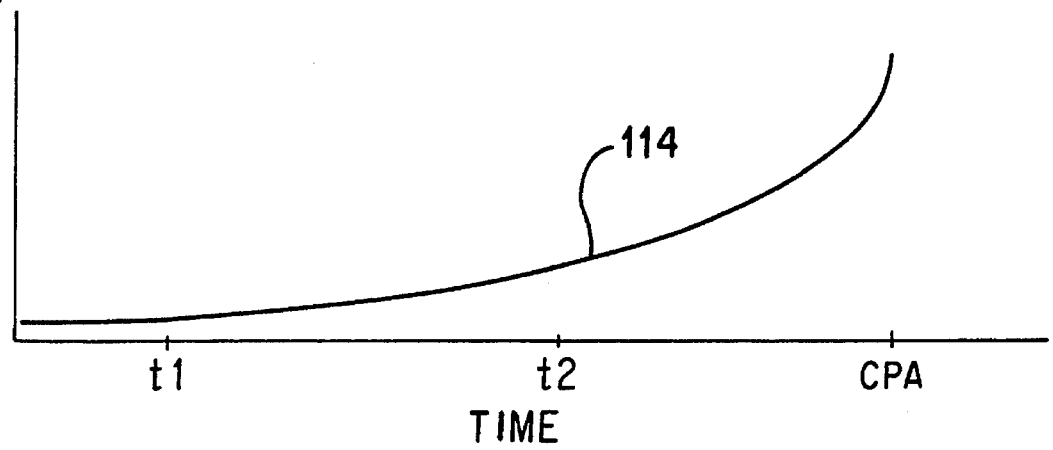
FIG. 3 is a graph of range acceleration versus time for an intruder aircraft.

Referring to FIG. 2, there is shown a graph of the range rate versus time for the aircraft 110. The velocity curve 112 follows a monotonically increasing curve from a negative value at time t1 to 0 at the closest point of approach, when the two aircraft are side-by-side. As the aircraft continue and pass one another, a mirror image of curve 112 would be produced above the zero reference line, providing a positive range rate. Similarly, the range acceleration versus time graph, shown in FIG. 3, also shows a monotonically increasing curve 114.

Looking at the range acceleration data, and utilizing a range measurement update rate of one second, filtered acceleration data provides an acceleration estimate standard deviation of 0.43 ft/s$^2$. Additionally, the actual aircraft trajectories will be influenced by unexpected aircraft motion that deviates from linear flight due to wind gusts, turbulence, etc. Such random, non-deliberate, maneuvers increase the RMS acceleration standard deviation estimate to approximately 0.5 ft/s$^2$. A multiple of the standard deviation is used to provide a conservative threshold for distinguishing aircraft whose horizontal miss distance is sufficiently close to zero to constitute an actual threat to one's own aircraft 200 and thereby need not be further processed by a horizontal miss distance filter. The range acceleration threshold is thus set at three times the standard deviation for the range acceleration, making the threshold 1.5 ft/s$^2$, as shown in FIG. 4

Figure 4:
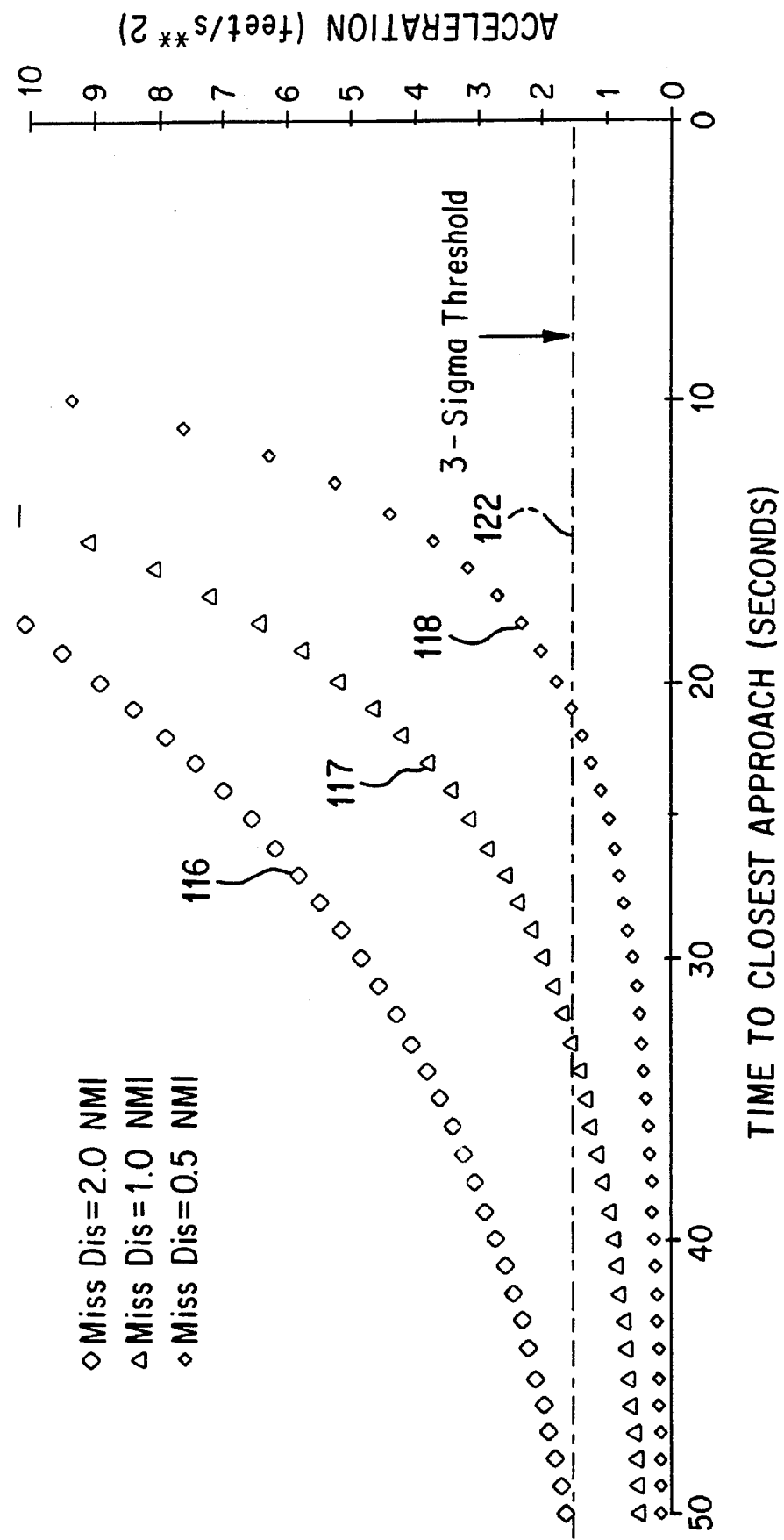
FIG. 4 is a graph of range acceleration versus time to closest approach for intruder aircraft at different miss distances.

In the particular example shown in FIG. 4, the aircraft are closing at a speed of 500 ft per second, and at the particular altitude of the aircraft a resolution alert message would be transmitted at an estimated time to closest approach of 25 seconds. As shown, an aircraft having a projected horizontal miss distance of two nautical miles has a range acceleration indicated by curve 116 which exceeds the threshold 122 at an estimated 50 seconds prior to closest approach, and would be filtered by the current TCAS system. For an aircraft having a projected horizontal miss distance of one nautical mile, as indicated by the curve 117, such exceeds the threshold value 122 at approximately 32 seconds prior to closest approach, and would not be filtered by the current TCAS system. Thus, in case indicated by the curve 117, a resolution alert which would be transmitted by the TCAS system at the time 25 seconds prior to closest approach could be suppressed, if other criteria are met. The miss distance for the aircraft having acceleration curves 116 and 117 are sufficiently displaced to not be a threat, if their relative flight paths remained unchanged, and therefore the data for such intruder aircraft warrants further processing. However, for an aircraft having a projected horizontal miss distance of 0.5 nautical miles, such has a range acceleration which remains below the threshold 122 at the time when the resolution alert message is transmitted, 25 seconds prior to closest approach. In this case, the resolution alert would not be suppressed, as the projected miss distance is sufficiently close to warrant one's own aircraft 200 to take an evasive maneuver. Intruder aircraft having a horizontal miss distance greater than 0.5 nautical miles may still be considered a threat and are distinguished from non-threats in further processing to be described in following paragraphs.

Figure 5:
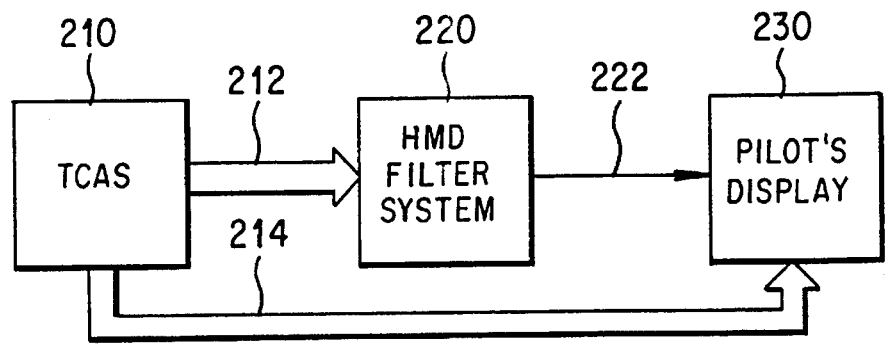
FIG. 5 is a system block diagram showing the interface of the present invention.

As shown in FIG. 5, the horizontal miss distance filter system 220 receives data 212 from the TCAS system 210. Such data will include the measured range data and may also include bearing (azimuth) data. TCAS system 210 also provides data 214 to the pilot's display 230 for display of intruder aircraft tracks. HMD filter system 220, utilizing the data supplied from TCAS system 210 inhibits those resolution advisory messages associated with aircraft whose projected horizontal miss distance is outside established threat limits, those not inhibited are transmitted to the pilot's display 230 on line 222. Utilization of the range acceleration state variable allows system 220 to separate encounters with intruder aircraft having very small miss distances, those which can be considered substantially zero. Other filtering is required to isolate intruder aircraft having a small horizontal miss distance from those having a sufficiently large horizontal miss distance, and to further account for aircraft which may be intentionally maneuvering.

Figure 6:
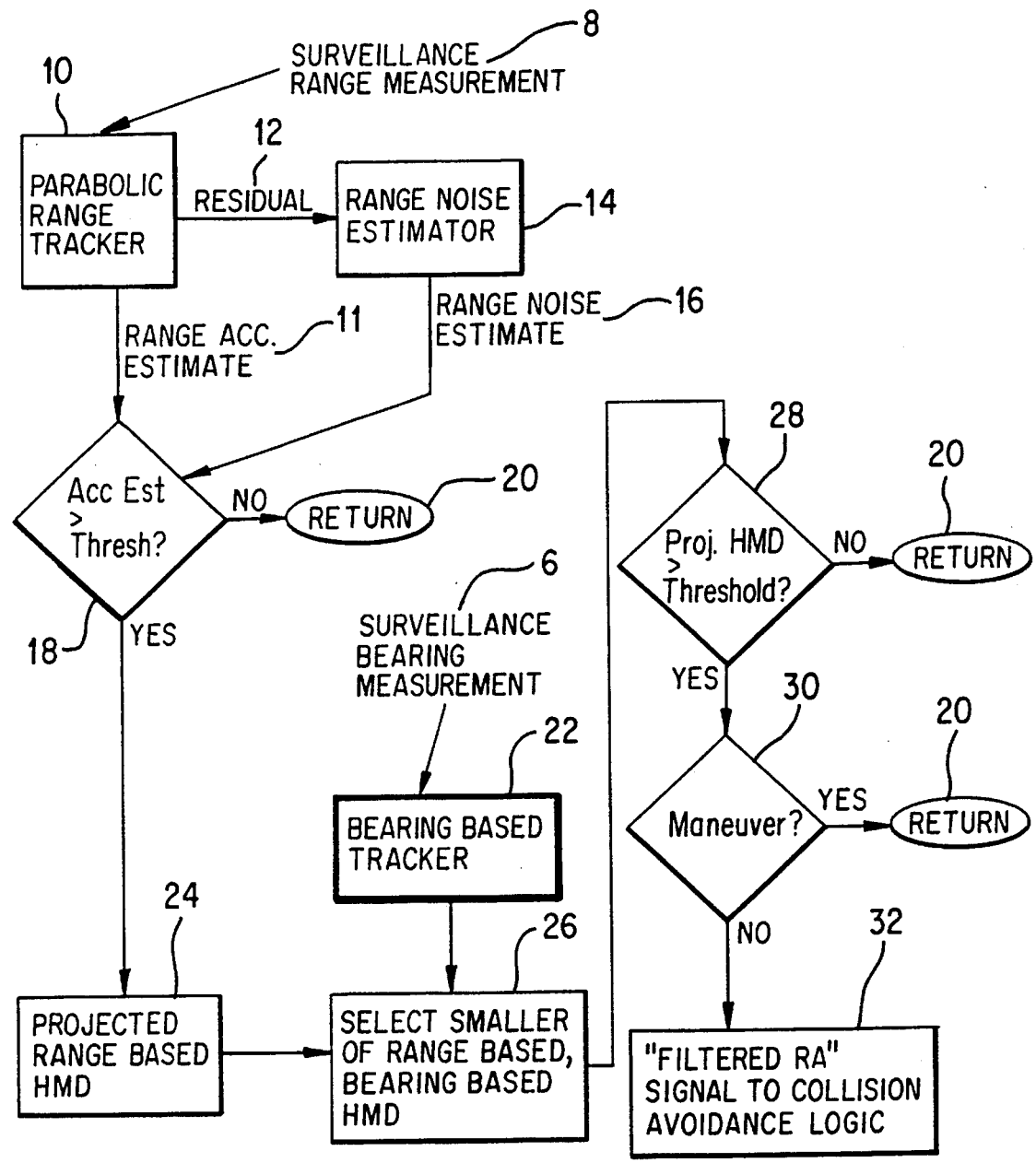
FIG. 6 is a flow chart of the present invention.

Turning now to FIG. 6, there is shown, a block flow diagram of system 220. The TCAS system supplies surveillance range measurements 8 at a predetermined update rate, typically once each second, to the parabolic range tracker 10. The parabolic range tracker accepts the surveillance range measurement (measured slant range) to the intruder aircraft and produces as outputs estimates of predicted range, predicted range rate, predicted range acceleration and a range tracking residual. The parabolic range tracker applies an alpha, beta, gamma tracking filter to the range measurements. The filter uses a parabolic state extrapolation model as follows:

$$A_P = A_S \quad (1)$$

$$V_P = V_S + \Delta t A_S \quad (2)$$

$$R_P = R_S + \Delta t V_S + \Delta t^2 A_S / 2 \quad (3)$$

where:

$A_P$ is the predicted range acceleration,
$V_P$ is the predicted range rate,
$R_P$ is the predicted range,
$A_S$ is the smoothed range acceleration,
$V_S$ is the smoothed range rate,
$R_S$ is the smoothed range, $\Delta t$ is the time interval between the last update and the current measurement.

The residual $R_E$ is calculated utilizing the equation:

$$R_E = R_M - R_P \quad (4)$$

where:

$R_M$ is the current measured range.

Smoothing is done according to the following equations:

$$R_S = R_P + \alpha R_E \quad (5)$$

$$V_S = V_P + \beta R_E / \Delta t \quad (6)$$

$$A_S = A_P + \gamma R_E / \Delta t^2 \quad (7)$$

The smoothing parameters, $\alpha$, $\beta$, $\gamma$ are shown in Table 1. The particular parameters used are based on the "firmness" of the data, with firmness being incremented with each successive target return and decremented when a target return is missing. One should also note that smoothing when the track firmness is zero or one requires no prediction; i.e., only the current measurement is used.

TABLE 1

| Param | Track Firmness | | | | | | | | |
|-------|---|---|---|---|---|---|---|---|---|
|       | 0 | 1 | 2 | 3 | 4 | 5 | 6 | 7 | 8 |
| α | 1.0 | 1.0 | 0.83 | 0.70 | 0.60 | 0.46 | 0.40 | 0.40 | 0.40 |
| β | 0.0 | 1.0 | 0.50 | 0.30 | 0.20 | 0.11 | 0.10 | 0.10 | 0.10 |
| γ | 0.0 | 0.0 | 0.16 | 0.07 | 0.035 | 0.013 | 0.01 | 0.01 | 0.01 |

The particular smoothing parameters disclosed have been selected to optimize particular characteristics of the filter. Other parameter values may be utilized without departing from the spirit or scope of the invention. Parabolic range tracker 10 outputs the residual value ($R_E$) 12 to the range noise estimator 14, and outputs the smoothed range acceleration estimate ($A_S$) 11 to the threshold test block 18 for comparison with the 3 sigma threshold 122, illustrated in FIG. 4.

Range noise estimator 14 provides the means for compensating for exceptionally noisy data received from the TCAS system 210. Range noise estimator 14 estimates the noise in the range measurements and provides an adjustment to the threshold 122, raising such to a higher level when the noise level is detected as being greater than that which would normally be expected. Range noise estimator 14 estimates noise by monitoring the range residuals. The range residuals are values representing the difference between the predicted range values from the alpha, beta, gamma tracker and the measured values. The standard deviation of the range residual is directly proportional to the standard deviation of the measurement error for the range tracker during linear flight. Thus, by continually estimating the variance of the residual, the range acceleration threshold can be adjusted proportionally to the estimate of range measurement variance, with the minimum threshold being 1.5 ft/$S^2$. Such keeps the probability of a false miss distance prediction approximately the same regardless of measurement noise. An estimate of range measurement error is provided by an alpha filter which is applied to the square of the range residuals. The average second moment of the residual is used as an estimate of the residual error, using the equation:

$$\hat{E}[R_E^2(n+1)] = \alpha \hat{E}[R_E^2(n)] + (1-\alpha) R_E^2(n+1) \quad (8)$$

where:

$\hat{E}[R_E^2(n+1)]$ is the estimated square of the residual of the current cycle, $\hat{E}[R_E^2(n)]$ is the estimated square of the residual from the previous cycle, $R_E^2(n+1)$ is the square of the residual from the current cycle, $\alpha$ is the smoothing parameter, with a nominal value of 0.1.

Then, the estimated standard error of the residual is:

$$\sigma_m = \{\hat{E}[R_E^2(n+1)]\}^{1/2} \qquad (9)$$

As shown in FIG. 6, the range noise estimate 16 is output from the range noise estimator 14 to the test block 18, for the purpose of adjusting the threshold upwardly when the range noise estimate exceeds the predicted value. The threshold is made equal to the larger of:

$$T_{A1} = \begin{cases} 1.5 \text{ ft/s}^2 \text{ or,} \\ 1.5 \sigma_m/35 \text{ ft/s}^2 \end{cases} \qquad (10)$$

where:
  1.5 value is nominally three standard deviations of the error in the acceleration estimate,
  35 ft is the expected value of the residual standard deviation.

Thus, when the estimated second moment of the residual exceeds 35 ft, the acceleration threshold is increased. Where the acceleration estimate does not exceed the threshold the flow moves from the test block 18 to the return block 20, ending miss distance processing until the next TCAS cycle. Therefore, any resolution alert issued for the particular intruder aircraft being monitored would not be suppressed, as such would have a horizontal miss distance which is projected to be very small, considered to be substantially zero.

Where the projected horizontal miss distance is not projected to be substantially zero, utilizing the range acceleration value versus the threshold for that determination, the flow passes to the projected range based horizontal miss distance calculation block 24. The range based horizontal miss distance is projected utilizing the following equation:

$$R_{HMD} = [R_S^2 - (R_S V_S)^2/(R_S A_S + V_S^2)]^{1/2} \qquad (11)$$

This value for horizontal miss distance based on the projected range based data is output to the horizontal miss distance selection block 26.

In parallel with the determination of the range based horizontal miss distance, a bearing based tracker 22 estimates the horizontal miss distance as well. Bearing based tracker 22 receives a surveillance bearing measurement 6 from the TCAS system 210 simultaneous with the receipt of the range measurement 8 by the parabolic range tracker 10. The state estimates for the bearing based tracker are maintained in cartesian coordinates as $R_{BX}$, $R_{BY}$, $V_{BX}$, $V_{BY}$. The state extrapolation is then performed utilizing the following equations:

$$R_{PX} = R_{BX} + \Delta t V_{BX} \qquad (12)$$

$$R_{PY} = R_{BY} + \Delta t V_{BY} \qquad (13)$$

$$V_{PY} = V_{BY} \qquad (14)$$

$$V_{PX} = V_{BX} \qquad (15)$$

where:
  $R_{BX}$, $R_{BY}$ is the estimated intruder position relative to own,
  $V_{BX}$, $V_{BY}$ is the estimated encounter velocity,
  $R_{PX}$, $R_{PY}$ is the predicted intruder position relative to own,
  $V_{PX}$, $V_{PY}$ is the predicted encounter velocity, $\Delta t$ is the time between the last update of the estimate and the time of the current measurement.

Accounting for the shape of the measurement error covariance is accomplished by resolving the track residuals into range and cross-range components. Separate alpha, beta smoothing parameters are applied to the range residual and cross-range residual. These smoothing parameters are selected to properly weight the measurement by its error. The cross-range smoothing parameters are determined by use of a two-state Kalman filter recursion, whereas the range smoothing parameters are fixed. The Kalman recursion allows for a dynamically changing cross-range measurement error during the progress of the encounter. The residual is first computed in Cartesian coordinates utilizing the following equations:

$$x_m = \rho_m \sin\theta_m \qquad (16)$$

$$y_m = \rho_m \cos\theta_m \qquad (17)$$

$$\Delta x = x_m - RPX \qquad (18)$$

$$\Delta y = y_m - RPY \qquad (19)$$

where:
  $\rho_m$ is the measured range,
  $\theta_m$ is the measured bearing,
  $x_m$, $y_m$ is the Cartesian representation of the measured position,
  $\Delta x$, $\Delta y$ is the measurement residual in Cartesian coordinates.

The residual is then rotated into range and cross-range components:

$$\Delta\rho = \Delta x \sin\theta_m + \Delta y \cos\theta_m \qquad (20)$$

$$\Delta\rho_X = \Delta y \sin\theta_m - \Delta x \cos\theta_m \qquad (21)$$

where:
  $\Delta\rho$ is the range measurement residual,
  $\Delta\rho_X$ is the cross-range measurement residual.

Smoothing then proceeds according to the following equations:

$$R_{BX} = R_{PX} + \alpha_1 \Delta\rho \sin\theta_m - \alpha_2 \Delta\rho_X \cos\theta_m \qquad (22)$$

$$R_{BY} = R_{PY} + \alpha_1 \Delta\rho \cos\theta_m + \alpha_2 \Delta\rho_X \sin\theta_m \qquad (23)$$

$$V_{BX} = V_{PX} + (B_1/\Delta t)\Delta\rho \sin\theta_m - (B_2/\Delta t)\Delta\rho_X \cos\theta_m \qquad (24)$$

$$V_{BY} = V_{PY} + (B_1/\Delta t)\Delta\rho \cos\theta_m + (B_2/\Delta t)\Delta\rho_X \sin\theta_m \qquad (25)$$

Separate smoothing parameters are applied to the range and cross-range components of the measurements. $\alpha_1$ and $B_1$ are the smoothing parameters to be applied in the range direction while $\alpha_2$ and $B_2$ are the smoothing parameters which are applied in the cross-range direction. By setting the cross-range smoothing parameters smaller than the range smoothing parameters, the bearing measurements are effectively de-weighted.

The predicted miss distance $B_{HMD}$ is then based on the Cartesian state estimate by the equation:

$$B_{HMD} = |R_{bx}V_{by} - R_{by}V_{bx}|/[(V_{bx})^2 + (V_{by})^2]^{1/2} \qquad (26)$$

The bearing based miss distance m is compared with the range based miss distance $R_{HMD}$ in block 26, wherein the smaller of the range based or bearing based horizontal miss distance is output to the test block 28. Thus, the most conservative projection of horizontal miss distance is utilized to determine whether a resolution alert should be inhibited.

Figure 8:
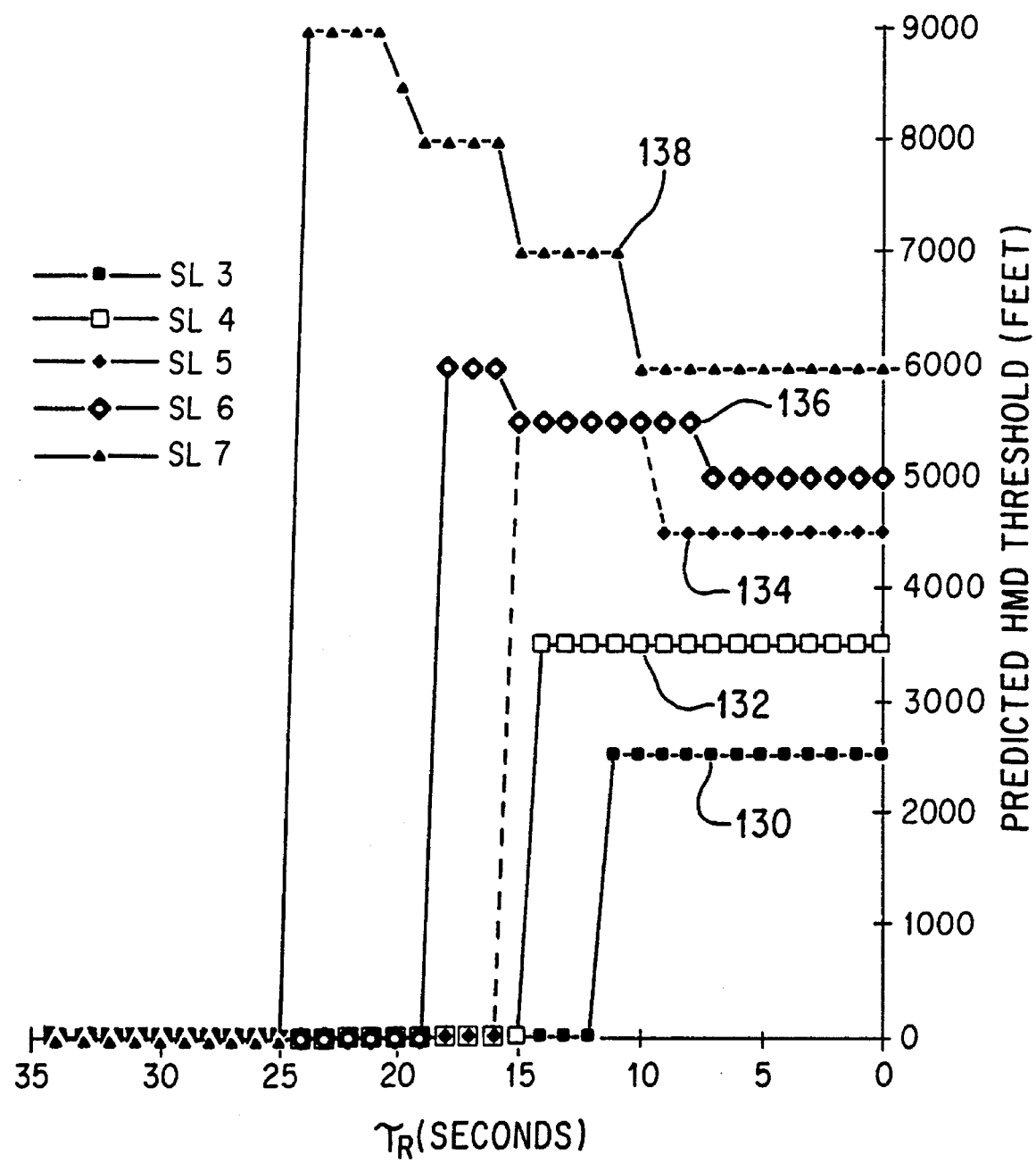

Test block 28 compares the projected horizontal miss distance provided by block 26 with a threshold value. The horizontal miss distance threshold is computed as a function of the TCAS sensitivity level and a range based time to closest approach ($\tau_R$). TCAS sensitivity levels are established by the altitude of the encounter. As shown in FIG. 8, the predicted horizontal miss distance threshold varies between the sensitivity levels 3 shown by graph line 130 through sensitivity level 7 indicated by graph line 138. The threshold relationship for sensitivity level 4 is shown by graph line 32, the relationship for sensitivity level 5 is shown by graph line 134 and the relationship for sensitivity level 6 is shown by graph line 136. Thus, based upon the sensitivity level established for the encounter and the time to closest approach of the processing cycle, a particular predicted horizontal miss distance threshold is utilized in test block 28. If the projected horizontal miss distance is less than this threshold value, then the intruder aircraft is considered to be sufficiently close to one's own aircraft to warrant the unimpeded transmission of a resolution alert from the TCAS system to the pilot's display, and thus the flow passes to the return block 20, and no suppression of a resolution alert is provided by system 220 during the current TCAS cycle. However, if the horizontal miss distance is projected to be greater than the threshold, then any resolution alert should be inhibited, unless it is determined that the intruder aircraft is maneuvering relative to one's own aircraft. If either aircraft is in the process of a deliberate maneuver, then a resolution alert should not be suppressed. Where the projected horizontal miss distance is determined to be greater than the threshold in block 28, the flow then passes to block 30 wherein a check is made to determine whether a maneuver is detected.

Figure 7:
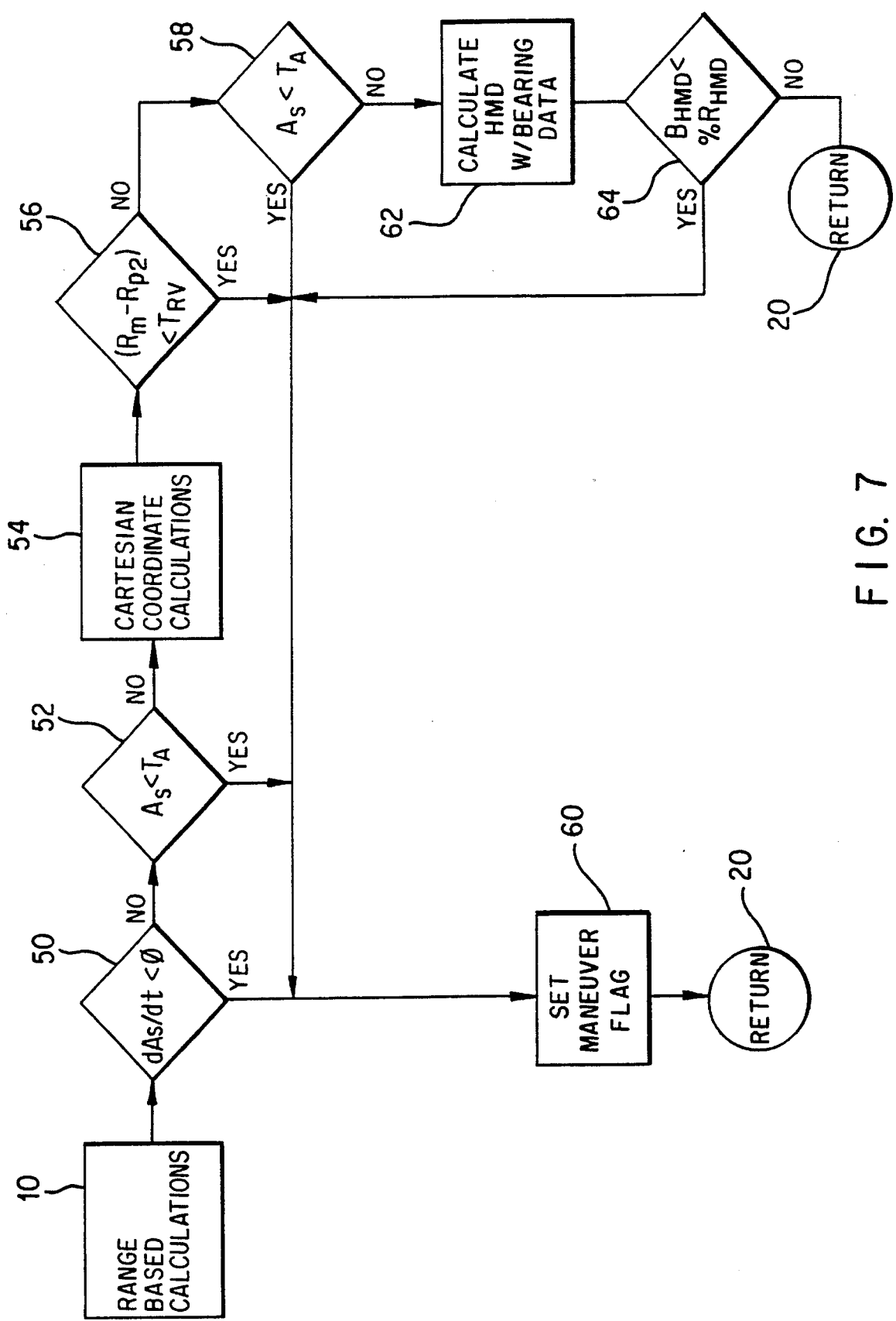
FIG. 7 is a flow chart of the maneuver detection system of the present invention; and, FIG. 8 is a graph of predicted horizontal miss distance thresholds versus time to closest point of approach.

Referring now to FIG. 7, there is shown, a logic flow diagram for the maneuver detection subsystem of system 220. Because there are a number of different maneuvers which an aircraft can make, including changes in speed, more than one maneuver detector is employed in the maneuver detection subsystem. In fact, five maneuver detectors are employed, and where any one of them establishes that a maneuver is taking place, such establishes a maneuver condition. The subsystem shown in FIG. 7 sets a flag when a maneuver condition is established which is tested for in block 30 of FIG. 6. When test block 30 indicates that a maneuver has been established, the flow passes to return block 20 so that any transmitted resolution or message is not suppressed. However, if no maneuver is indicated in test block 30, the flow passes to block 32 which inhibits any resolution alert message in the current TCAS cycle. Where a maneuver is indicated in test block 30, in addition to not inhibiting a resolution alert in the current TCAS cycle, system 220 is shut down for a fixed number of TCAS cycles to allow conditions of the intruder aircraft to stabilize. Nominally, horizontal miss distance filter system 220 may be shut down for ten TCAS cycles before being re-enabled to determine whether any resolution alert messages warrant suppression.

The first maneuver detector 50 is based on the observation that during a linear encounter with an intruder having a non-zero miss distance, range acceleration monotonically increases. The maneuver detector 50 simply observes the range acceleration estimates to be sure that they continually increase. To determine that the range acceleration is increasing, an alpha filter is placed on the difference in cycle-to-cycle estimated range acceleration. The alpha filter keeps jumps in range acceleration due to random noise from triggering the maneuver detector. The effective output of the alpha filter is an estimate of the third derivative of range, which is the derivative of range acceleration provided from equation (7). A maneuver is declared when the estimated third derivative of range drops below zero. The equation which defines the alpha filter for this maneuver detector is:

$$dA_S(n)/dt=(1-\alpha)dA_S(n-1)/dt+\alpha(A_P-A_S) \tag{27}$$

where:

$A_S$ is the result of equation (7), $A_P$ is the result of equation (1), $\alpha$ is the filter's smoothing parameter with a nominal value of 0.1, n is the current TCAS processing cycle, n-1 is the previous TCAS processing cycle.

Therefore, if $dA_S/dt$ is less than zero, a maneuver is declared by detector 50. Thus, the ranged based calculations of range acceleration are provided by the parabolic range tracker 10 to the test block 50, wherein it is determined whether or not the derivative of range acceleration is less than zero. If it is less than zero, flow passes to the block 60 wherein a maneuver flag is set and tested for by block 30 in FIG. 6. Subsequent to setting a maneuver flag the flow passes to return block 20.

If a maneuver is not detected in test block. 50, flow passes to the next maneuver detector 52. The second maneuver detector 52 makes use of the fact that if range acceleration is less than zero, a maneuver is taking place. For determining whether the range acceleration is less than zero, the three sigma threshold calculated in equation (10) is utilized. Thus, if $A_S$ is less than $-T_{A1}$, a maneuver is declared. If the second maneuver detector 52 indicates a maneuver, flow again passes to block 60. If however no maneuver is detected in test block 52, flow passes to block 54 wherein a number of Cartesian coordinate calculations are made by a cartesian coordinate tracker 54.

Like the parabolic range tracker 10, the Cartesian range tracker 54 has as its input the surveillance range measurement provided by the TCAS system. The output of cartesian tracker 54 is a measurement residual utilized by the third maneuver detector 56. The difference between the cartesian range tracker and the parabolic range tracker is in the state extrapolation model. The cartesian tracker uses a different state extrapolation model than the parabolic tracker whenever the cartesian tracker's range acceleration estimate exceeds the acceleration threshold 122. Specifically, the equations (1) (2) and (3) are substituted with the following equations:

$$R_{YS}=R_S V_S/V_{YS} \tag{28}$$

$$V_{YS}=[R_S A_S+(V_S)^2]^{1/2} \tag{29}$$

$$R_{XS}=[(R_S)^2-(R_{YS})^2]^{1/2} \tag{30}$$

The state extrapolation is then performed in Cartesian coordinates as follows:

$$X_P=R_{XS} \tag{31}$$

$$V_{YP}=V_{YS} \tag{32}$$

$$Y_P=R_{YS}+\Delta t V_{YS} \tag{33}$$

where:

Δt is the prediction time interval, $X_P, Y_P$ is the predicted horizontal position of the intruder, $V_P$ is the Y coordinate of the predicted range acceleration. Subsequent to the prediction being made in Cartesian coordinates, the state is inverted back into range coordinates for smoothing using the following equations:

$$R_{P2} = [(X_P)^2 + (Y_P)^2]^{1/2} \tag{34}$$

$$V_{P2} = Y_P V_{PY}/R_{P2} \tag{35}$$

$$A_{P2} = (X_P)^2 (V_{PY})^2/(R_{P2})^3 \tag{36}$$

The track residual and smoothing is then performed identically to that which has been described for the parabolic range tracker.

The Cartesian range tracker is a more accurate representation of a linear encounter between the intruder aircraft and one's own aircraft. Since the assumptions of this model are based on linear trajectories, when a maneuver is taking place the basic assumptions of the model are not met and the extrapolations made thereby become noticeably inaccurate. It is this characteristic which can then be utilized for identifying maneuvering aircraft. Thus, by monitoring the residual of the Cartesian tracker and looking to see when that filter's prediction versus the actual measurement is greater than a threshold value, we can identify that a maneuver is taking place. When an intruder aircraft is converging on a trajectory which is converging with one's own aircraft, the cartesian tracker will produce a predicted range measurement which is greater than the actual range measurement. A maneuver will then be declared when the difference between the measured range value and the predicted range value gets to be large and negative. In the case where the intruder aircraft is maneuvering and its trajectory is diverging from one's own aircraft, the measured range value would be greater than the predicted range value. Therefore, we can look at the sign of the residual to determine whether or not the intruder is converging or diverging, and thus set the maneuver flag in block 60 when a converging maneuver is detected, and avoid a false resolution alert for an intruder whose trajectory is diverging.

Thus, in block 56 we test the residual, the measured range $R_M$ minus the projected Cartesian coordinate based range $R_{P2}$, to determine whether it is negative, less than a predetermined threshold value $(T_{RV})$ which defines a predetermined range variance about the zero reference level. In this manner, when a maneuver is detected by maneuver detector 56, which indicates a converging maneuver, the residual being sufficiently negative, the flow passes to the block 60. If no maneuver is detected, or the maneuver is identified as converging, flow passes to a fourth maneuver detector 58.

Fourth maneuver detector 58 also makes use of the data from the Cartesian coordinate tracker 54. The fourth maneuver detector 58 makes use of the fact that if range acceleration is less than zero, a maneuver is taking place. Therefore, utilizing the Cartesian coordinate calculations, the smoothed range acceleration value is compared with the three sigma acceleration threshold. If the test performed in block 58 indicates a range acceleration (calculated in block 54) which is more negative than the threshold value, then the flow passes to block 60 to indicate that a maneuver has been identified. If the acceleration is not less than the threshold, then the flow passes to block 62.

The fifth maneuver detector 64 is intended to detect changes in relative speed between one's own aircraft and the intruder aircraft. If the intruder's speed is decreasing relative to one's own aircraft, or if one's own aircraft speed is decreasing relative to the intruder, a positive range acceleration is produced, as the rate of closure between the two aircraft is slowing. This type of maneuver would "fool" the parabolic range tracker into predicting a high miss distance, when in fact such would not be the case. In the particular encounter in which the fifth detector 64 functions, the intruder is coming in on a straight trajectory, with a small horizontal miss distance. In such a situation, even though the intruder is changing speed, the bearing measurements will be constant, and this fact can be used to identify a speed change maneuver.

Thus, in block 62 the horizontal miss distance $B_{HMD}$ equation (26) is calculated using the data from the bearing base tracker 22 for output to the fifth detector 64. Test block 64 compares the bearing based horizontal miss distance $B_{HMD}$ with a percentage of the range based horizontal miss distance $R_{HMD}$ in order to identify that a speed change maneuver is taking place. Nominally, when the bearing based horizontal miss distance is less than one half the projected range based horizontal miss distance, such reliably identifies a speed based maneuver.

The time to closest approach τ (Tau) is estimated utilizing the equation:

$$\tau = R_P/V_P \tag{37}$$

where:

$R_P$ is the predicted range, $V_P$ is the predicted range rate.

The time to closest approach is the only means for filtering large horizontal miss distance encounters. More recently, τ has been corrected to account for possible accelerations by the use of the term DMOD. The corrected estimated time to collision (closest point of approach) $\tau_R$ is established by the equation:

$$\tau_R = -(R_P - DMOD^2/R_P)/V_P \tag{38}$$

where:

$R_P$ is the range tracker's estimated range, $V_P$ is the range tracker's estimated range rate, DMOD is a correction value to make the alarm boundary sufficiently large to provide protection against intruder turns.

The term DMOD essentially adds time to the estimated τ value as a safety factor. However, this value can be made more accurate utilizing the acceleration estimate provided by the parabolic range tracker of system 220. Use of the parabolic tracker's range acceleration estimate improves two properties of the $\tau_R$ function. First, utilizing the parabolic tracker's range acceleration estimate, allows the $\tau_R$ value to decrease more slowly for high horizontal miss distance encounters, allowing a reduced false alarm rate. Secondly, the $\tau_R$ value will decrease more quickly for small high miss distance encounters with negative range accelerations, allowing improved near mid-air collision detection. In particular, this better detection results in better detection of "inside" turn maneuvers.

To perform the correction to $\tau_R$, $\tau_R$ is first calculated as in equation (38). If the range acceleration of the parabolic tracker is smaller than the acceleration threshold, no correction is necessary, as any resolution alert message transmitted for such an intruder would not need to be inhibited. If on the other hand the range acceleration has been calculated to be above the threshold, a correction to the range rate is computed for a range rate which would result if the estimated range acceleration were applied until the closest point of approach, utilizing the equation:

$$V_C = V_S + \tau_R A_S \tag{39}$$

where:

$V_C$ is the corrected velocity, $V_S$ is the parabolic tracker's smoothed estimate of range rate, $A_S$ is the parabolic tracker's smoothed estimate of range-acceleration, $\tau_R$ is the result of equation (37).

$\tau_R$ is then recomputed using the average expected range rate between the current time and $\tau_R$, yielding:

$$\tau_R = -2(R_{S-DMOD}^2/R_S)/(V_S + V_C) \tag{40}$$

This new $\tau_6$ value can then be output to the TCAS system 210 for utilization in identifying the critical time periods for determining whether a resolution alert message should be transmitted for a particular intruder aircraft.

Thus, by providing a horizontal miss distance filter system 220 to an air traffic alert and collision avoidance system, such as TCAS system 210, overall safety and effectiveness of a critical air safety system can be improved to the benefit of the traveling public. The effectiveness of the system is increased through reduced false alarms which cause aircraft to deviate from their intended flight paths unnecessarily, which in itself adds risk to respective airline pilots and airline passengers. The horizontal miss distance filter 220 distinguishes intruder aircraft which present no collision threat utilizing several different methods, and avoids mistakenly missing a potential collision threat where an aircraft is maneuvering in either speed or direction.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, relative locations of elements may be reversed or interposed, all without departing from the spirit or scope of the invention as defined in the appended claims.

What is claimed is:

1. A system for suppressing a false resolution alert message from an air traffic alert and collision avoidance system, comprising:

means for input of a surveillance range measurement of an intruder aircraft from the air traffic alert and collision avoidance system;

range tracking means coupled to said surveillance range measurement input means for determining horizontal miss distances greater than a predetermined value using at least a second derivative of a predicted range of the intruder aircraft, said second derivative of said predicted range of the intruder aircraft being greater than a predetermined first threshold value; and, inhibit means coupled to said range tracking means and the air traffic alert and collision avoidance system for inhibiting transmission of a resolution alert message responsive to said determined horizontal miss distance being greater than said predetermined value.

2. The system as recited in claim 1 further comprising threshold modifying means coupled to said range tracking means for modifying said first threshold value responsive to a difference between said surveillance range measurement and a calculated predicted range value.

3. The system as recited in claim 2 further comprising bearing tracking means having a surveillance bearing input coupled to said air traffic alert and collision avoidance system for calculating a bearing based horizontal miss distance.

4. The system as recited in claim 3 where said range tracking means includes an input coupled to said bearing tracking means for input of said bearing based horizontal miss distance, said range tracking means including means for selecting a minimum horizontal miss distance from a comparison of said bearing based horizontal miss distance with a range based horizontal miss distance, said minimum horizontal miss distance being compared with said predetermined value, said inhibit means inhibiting transmission of a resolution alert message responsive to said minimum horizontal miss distance being greater than said predetermined value.

5. The system as recited in claim 4 further comprising maneuver detecting means coupled to said range tracking means and said inhibit means for preventing said inhibition of transmission of a resolution alert message responsive to a determination that an intruder aircraft is changing in either direction or speed.

6. The system as recited in claim 1 where said range tracking means further utilizes said predicted range of the intruder aircraft and a predicted range rate of the intruder aircraft.

7. The system as recited in claim 6 where said range tracking means includes means for modifying said first threshold value responsive to a difference between said surveillance range measurement and said predicted range.

8. The system as recited in claim 7 further comprising bearing tracking means having a surveillance bearing input coupled to said air traffic alert and collision avoidance system for calculating a bearing based horizontal miss distance.

9. The system as recited in claim 8 where said range tracking means includes an input coupled to said bearing tracking means for input of said bearing based horizontal miss distance, said range tracking means including means for selecting a minimum horizontal miss distance from a comparison of said bearing based horizontal miss distance with a range based horizontal miss distance, said minimum horizontal miss distance being compared with said predetermined value, said inhibit means inhibiting transmission of a resolution alert message responsive to said minimum horizontal miss distance being greater than said predetermined value.

10. The system as recited in claim 9 further comprising maneuver detecting means coupled to said range tracking means and said inhibit means for preventing said inhibition of transmission of a resolution alert message responsive to a determination that an intruder aircraft is changing in either direction or speed.

11. The system as recited in claim 10 where said maneuver detecting means includes a first maneuver detector having an input coupled to said range tracking means, said first maneuver detector identifying an intruder aircraft is maneuvering responsive to calculation of a third derivative of said predicted range being less than zero.

12. The system as recited in claim 11 where said maneuver detecting means includes a second maneuver detector having an input coupled to said range tracking means, said second maneuver detector identifying an intruder aircraft is maneuvering responsive to calculation of said predicted range acceleration being less than a predetermined second threshold value.

13. The system as recited in claim 12 where said maneuver detecting means includes Cartesian tracking means coupled to said air traffic alert and collision avoidance system for calculating a Cartesian coordinate range, a Cartesian coordinate range rate, and a Cartesian coordinate range acceleration.

14. The system as recited in claim 13 where said maneuver detecting means includes a third maneuver detector having an input coupled to said Cartesian tracking means, said third maneuver detector identifying an intruder aircraft is maneuvering responsive to calculation of said Cartesian coordinate range acceleration being less than a predetermined third threshold value.

15. The system as recited in claim 14 where said maneuver detecting means includes a fourth maneuver detector having an input coupled to said Cartesian tracking means, said fourth maneuver detector identifying an intruder aircraft is maneuvering responsive to calculation of a difference between said Cartesian coordinate range and said surveillance range measurement being less than a predetermined fourth threshold value.

16. The system as recited in claim 15 where said maneuver detecting means includes a fifth maneuver detector having an input coupled to said bearing tracking means, said fifth maneuver detector identifying an intruder aircraft is maneuvering responsive to calculation of said bearing based horizontal miss distance being less than a predetermined percentage of said range based horizontal miss distance.

17. The system as recited in claim 16 where said maneuver detecting means includes means for preventing said inhibition of transmission of a resolution alert message responsive to identification of an intruder aircraft as maneuvering by any one of said first, second, third, fourth, and fifth maneuver detectors.

18. The system as recited in claim 1 further comprising bearing tracking means having a surveillance bearing input coupled to said air traffic alert and collision avoidance system for calculating a bearing based horizontal miss distance.

19. The system as recited in claim 18 where said range tracking means includes an input coupled to said bearing tracking means for input of said bearing based horizontal miss distance, said range tracking means including means for selecting a minimum horizontal miss distance from a comparison of said bearing based horizontal miss distance with a range based horizontal miss distance, said minimum horizontal miss distance being compared with said predetermined value, said inhibit means inhibiting transmission of a resolution alert message responsive to said minimum horizontal miss distance being greater than said predetermined value.

20. The system as recited in claim 19 further comprising maneuver detecting means coupled to said range tracking means and said inhibit means for preventing said inhibition of transmission of a resolution alert message responsive to a determination that an intruder aircraft is changing in either direction or speed.

21. The system as recited in claim 20 where said maneuver detecting means includes a maneuver detector having an input coupled to said range tracking means, said maneuver detector identifying an intruder aircraft is maneuvering responsive to calculation of a third derivative of said predicted range being less than zero.

22. The system as recited in claim 20 where said maneuver detecting means includes a maneuver detector having an input coupled to said range tracking means, said maneuver detector identifying an intruder aircraft is maneuvering responsive to calculation of said predicted range acceleration being less than a predetermined second threshold value.

23. The system as recited in claim 20 where said maneuver detecting means includes Cartesian tracking means coupled to said air traffic alert and collision avoidance system for calculating a Cartesian coordinate range, a Cartesian coordinate range rate, and a Cartesian coordinate range acceleration.

24. The system as recited in claim 23 where said maneuver detecting means includes a maneuver detector having an input coupled to said Cartesian tracking means, said maneuver detector identifying an intruder aircraft is maneuvering responsive to calculation of said Cartesian coordinate range acceleration being less than a predetermined third threshold value.

25. The system as recited in claim 23 where said maneuver detecting means includes a maneuver detector having an input coupled to said Cartesian tracking means, said maneuver detector identifying an intruder aircraft is maneuvering responsive to calculation of a difference between said Cartesian coordinate range and said surveillance range measurement being less than a predetermined fourth threshold value.

26. The system as recited in claim 20 where said maneuver detecting means includes a maneuver detector having an input coupled to said bearing tracking means, said maneuver detector identifying an intruder aircraft is maneuvering responsive to calculation of said bearing based horizontal miss distance being less than a predetermined percentage of said range based horizontal miss distance.

27. The system as recited in claim 1 further comprising means for compensating an estimated time to a closest point of approach of an intruder aircraft, said compensating means providing a corrected range rate corresponding to an estimated range acceleration applied for a time period established by said estimated time to a closest point of approach.

28. A system for suppressing a false resolution alert message from an air traffic alert and collision avoidance system, comprising:

means for input of a surveillance range measurement of an intruder aircraft from the air traffic alert and collision avoidance system;

range tracking means coupled to said surveillance range measurement input means for determining horizontal miss distances greater than a predetermined value using at least a second derivative of a predicted range of the intruder aircraft, said second derivative of said predicted range of the intruder aircraft being greater than a predetermined first threshold value, said range tracking means including maneuver detecting means for determining that the intruder aircraft is changing in either direction or relative speed and providing a maneuver indication output; and, inhibit means coupled to said range tracking means and the air traffic alert and collision avoidance system for inhibiting transmission of a resolution alert message responsive to said determined horizontal miss distance being greater than said predetermined value and an absence of said maneuver indication output.

29. The system as recited in claim 28 where said range tracking means further utilizes said predicted range of the intruder aircraft and a predicted range rate of the intruder aircraft.

30. The system as recited in claim 29 where said range tracking means includes means for modifying said first threshold value responsive to a difference between said surveillance range measurement and said predicted range.

31. A method of detecting that an intruder aircraft is maneuvering in an air traffic alert and collision avoidance system, comprising the steps:

providing measured range values of the intruder aircraft at predetermined time intervals;

calculating a predicted range value based on measured range values;

calculating a third derivative of said predicted range value;

determining an occurrence of a maneuver of the intruder aircraft responsive to said third derivative of said predicted range value being less than zero; and, inputting an indication of said determined occurrence of a maneuver of the intruder aircraft to an alert filter system for inhibiting said filter system from suppressing an alert message output relative to the intruder aircraft.

32. The method of claim 31 further comprising the steps of:

calculating a second derivative of said predicted range value; and, determining the occurrence of a maneuver responsive to said second derivative of said predicted range value being less than an acceleration threshold value.

33. The method of claim 31 further comprising the steps of:

calculating a predicted range value in a Cartesian coordinate system based on said measured range values;

calculating of a second derivative of said predicted Cartesian coordinate range value; and, determining the occurrence of a maneuver responsive to said second derivative of said predicted Cartesian coordinate range value being less than a Cartesian acceleration threshold.

34. The method of claim 33 further comprising the steps of:

calculating a difference between said predicted Cartesian coordinate range value and a corresponding one of said measured range values; and, determining the occurrence of a maneuver responsive to said calculated difference being less than a predetermined range difference threshold value.

35. The method of claim 31 further comprising the steps of:

calculating a range based horizontal miss distance from said measured range values;

providing a relative bearing value;

calculating a bearing based horizontal miss distance using said relative bearing value; and, determining the occurrence of a maneuver responsive to said bearing based horizontal miss distance being less than a predetermined percentage of said range based horizontal miss distance.

36. A method of suppressing a false resolution alert message from an air traffic alert and collision avoidance system, comprising the steps of:

a) providing a measured range value to an intruder aircraft;

b) calculating a predicted range value, a predicted range velocity value and a predicted range acceleration value based on said measured range value for a predetermined future time interval;

c) comparing said predicted range acceleration value with an acceleration threshold value;

d) if said predicted range acceleration value is less than said acceleration threshold value, proceeding to step (a), otherwise continuing;

e) calculating a projected horizontal miss distance for the intruder aircraft;

f) comparing said projected horizontal miss distance with a distance threshold value;

g) if said projected horizontal miss distance is less than said distance threshold value, proceeding to step (a), otherwise continuing;

h) determining whether there is a change in either of a relative direction or a relative speed of the intruder aircraft to identify a maneuvering condition;

i) if said maneuvering condition is identified, proceeding to step (a), otherwise continuing; and, j) inhibiting a resolution alert message from the air traffic alert and collision avoidance system.

37. The method of claim 36 where said step of comparing said predicted range acceleration value with an acceleration threshold value includes the steps of calculating a difference between said measured range value and said predicted range value, and adjusting said acceleration threshold value responsive to said calculated difference being greater than a predetermined value.

38. The method of claim 36 where said step of calculating a projected horizontal miss distance includes the steps of:

a) providing a bearing measurement;

b) calculating a first horizontal miss distance from said predicted range value, said predicted range velocity value and said predicted range acceleration value;

c) calculating the intruder aircraft's relative estimated position and estimated velocity in Cartesian coordinates from said bearing measurement;

d) calculating a second horizontal miss distance from said relative estimated position and said estimated velocity;

e) comparing said first horizontal miss distance with said second horizontal miss distance to determine a minimum horizontal miss distance and identifying said minimum horizontal miss distance as said projected horizontal miss distance.

39. The method as recited in claim 38 where said step of determining whether there is a change in either of a relative direction or a relative speed includes the steps of comparing said second horizontal miss distance with said first horizontal miss distance, and identifying said maneuver condition responsive to said second horizontal miss distance being less than a predetermined percentage of said first horizontal miss distance.

* * * * *